US009286187B2

(12) United States Patent
Brucker et al.

(10) Patent No.: US 9,286,187 B2
(45) Date of Patent: Mar. 15, 2016

(54) STATIC ENFORCEMENT OF PROCESS-LEVEL SECURITY AND COMPLIANCE SPECIFICATIONS FOR CLOUD-BASED SYSTEMS

(75) Inventors: Achim D. Brucker, Karlsruhe (DE); Isabelle Hang, Karlsruhe (DE)

(73) Assignee: SAP SE, Walldorf (DE)

( * ) Notice: Subject to any disclaimer, the term of this patent is extended or adjusted under 35 U.S.C. 154(b) by 287 days.

(21) Appl. No.: 13/598,928

(22) Filed: Aug. 30, 2012

(65) Prior Publication Data

US 2014/0068697 A1    Mar. 6, 2014

(51) Int. Cl.
| | | |
|---|---|---|
| G06F 17/00 | (2006.01) |
| H04L 29/06 | (2006.01) |
| G06F 11/36 | (2006.01) |
| G06F 21/56 | (2013.01) |

(52) U.S. Cl.
CPC .......... *G06F 11/3604* (2013.01); *G06F 21/563* (2013.01)

(58) Field of Classification Search
CPC .......... H04L 63/10; H04L 63/20; G06F 8/10; G06F 21/60; G06Q 10/04; G06Q 10/06; G06Q 10/10
USPC ...................................................... 726/1, 25
See application file for complete search history.

(56) References Cited

U.S. PATENT DOCUMENTS

| | | | |
|---|---|---|---|
| 8,104,089 B1* | 1/2012 | Guo et al. ........................ 726/24 |
| 2004/0107414 A1* | 6/2004 | Bronicki et al. ............... 717/105 |
| 2005/0044197 A1* | 2/2005 | Lai ................................. 709/223 |
| 2005/0120332 A1* | 6/2005 | Martin .................... G06Q 10/10 717/105 |
| 2006/0174222 A1* | 8/2006 | Thonse ...................... G06F 8/10 717/106 |
| 2007/0067756 A1* | 3/2007 | Garza ............................ 717/136 |
| 2008/0263505 A1* | 10/2008 | StClair ...................... G06F 8/10 717/101 |
| 2009/0055804 A1* | 2/2009 | Blaschek et al. .............. 717/126 |
| 2009/0198639 A1* | 8/2009 | Narayanaswamy et al. .... 706/48 |
| 2009/0287837 A1* | 11/2009 | Felsher ......................... 709/229 |
| 2011/0029947 A1* | 2/2011 | Markovic ...................... 717/102 |
| 2012/0030120 A1* | 2/2012 | Rosa .................... G06Q 10/067 705/52 |

OTHER PUBLICATIONS

Achim D. Brucker et al., "Secure and Compliant Implementation of Business Process-driven Systems," Proceedings of the 1st Joint International Workshop on Security in Business Processes (SBP'12), Lecture Notes in Business Information Processing (LNBIP) 132, Sep. 2012, pp. 662-674.
American National Standards Institute (ANSI), "American National Standard for Information Technology—Role Based Access Control," INCITS 359-2004, Feb. 2004, 56 pages.

(Continued)

*Primary Examiner* — Peter Poltorak
*Assistant Examiner* — Huan V Doan
(74) *Attorney, Agent, or Firm* — Fish & Richardson P.C.

(57) ABSTRACT

Implementations of the present disclosure are directed to statically checking conformance of a computer-implemented service at a source code level to requirements specified at a process level and include actions of receiving source code of the computer-implemented service, receiving one or more rules, the one or more rules being generated based on a mapping and including a set of technical requirements that can be checked on the source code level, the mapping associating the requirements with the source code, and processing the source code and the one or more rules using static code analysis (SCA) to generate a result, the result indicating whether the computer-implemented service conforms to the requirements.

11 Claims, 5 Drawing Sheets

(56) References Cited

OTHER PUBLICATIONS

W.M.P. van der Aalst et al., "Process Mining and Security: Detecting Anomalous Process Executions and Checking Process Conformance," Journal Electronic Notes in Theoretical Computer Science (ENTCS), vol. 121, Feb. 2005, pp. 3-21.

W.M.P. van der Aalst et al., "Correctness-Preserving Configuration of Business Process Models," Proceedings of the Fundamental Approaches to Software Engineering (FASE 2008), Apr. 1-3, 2008, 16 pages.

Rafael Accorsi et al., "InDico: Information Flow Analysis of Business Processes for Confidentiality Requirements," Proceedings of the 6th International Workshop on Security and Trust Management (STM'10), LNCS 6710, Sep. 2010, pp. 194-209.

Wihem Arsac et al., "Security Validation of Business Processes via Model-Checking," Proceedings of the International Symposium on Engineering Secure Software and Systems (ESSoS'11), LNCS 6542, Feb. 2011, pp. 29-42.

Basel Committee on Banking Supervision, "Basel III: A global regulatory framework for more resilient banks and banking systems," Bank for International Settlements, Basel, Switzerland, Dec. 2010, retrieved from http://www.bis.org/publ/bcbs189.pdf, 77 pages.

David Basin et al., "Automated Analysis of Security-Design Models," Information and Software Technology, Special Issue: Model-Driven Development for Secure Information Systems, vol. 51, Issue 5, May 2009, pp. 815-831.

David Basin et al., "Model Driven Security: from UML Models to Access Control Infrastructures," ACM Transactions on Software Engineering and Methodology, vol. 15, Issue 1, Jan. 2006, pp. 39-91.

Achim D. Brucker et al., "An Approach to Modular and Testable Security Models of Real-world Health-care Applications," Proceedings of the 16th ACM Symposium on Access Control Models and Technologies, SACMAT'11, Jun. 2011, pp. 133-142.

Achim D. Brucker et al., "Metamodel-based UML Notations for Domain-specific Languages," Proceedings of the 4th International Workshop on Software Language Engineering, ATEM 2007, Sep.-Oct. 2007, 15 pages.

Achim D. Brucker et al., "A Model Transformation Semantics and Analysis Methodology for SecureUML," Proceedings of the MoDELS 2006: Model Driven Engineering Languages and Systems, LNCS 4199, pp. 306-320.

Achim D. Brucker et al., SecureBPMN: Modeling and Enforcing Access Control Requirements in Business Processes, Proceedings of the 17th ACM Symposium on Access Control Models and Technologies, SACMAT'12, Jun. 2012, pp. 123-126.

Achim D. Brucker et al., "Extending Access Control Models with Break-glass," Proceedings of the 14th ACM Symposium on Access Control Models and Technologies, SACMAT'09, Jun. 2009, pp. 197-206.

Remco M. Dijkman et al., "Semantics and analysis of business process models in BPMN," Information and Software Technology, vol. 50, Issue 12, Nov. 2008, pp. 1281-1294.

Centers for Medicare and Medicaid Services, 'HIPAA: Health Insurance Portability and Accountability Act of 1996' [online], retrieved on Dec. 10, 2012, from http://www.cms.hhs.gov/HIPAAGenInfo/, 2 pages.

J. Jürjens et al., "Model-based Security Analysis of the German Health Card Architecture," Methods of Information in Medicine, vol. 47, Issue 5, 2008, pp. 409-416.

Mathias Kohler et al., "ProActive Caching: Generating Caching Heuristics for Business Process Environments," Proceedings of the International Conference on Computational Science and Engineering, CSE 2009, Aug. 2009, pp. 207-304.

Torsten Lodderstedt et al., "SecureUML: aUML-Based Modeling Language for Model-Driven Security," Proceedings of the 5th International Conference on the Unified Modeling Language, UML'02, LNCS 2460, Oct. 2002, pp. 426-441.

Philip L. Miseldine, "Automated XACML Policy Reconfiguration for Evaluation Optimization," Proceedings of the Fourth International Workshop on Software Engineering for Secure Systems, SESS'08, May 2008, pp. 1-8.

Julia Mülle et al., "A Security Language for BPMN Process Models," Technical. Report, Karlsruhe Institut für Technologie (KIT), 2011, 25 pages.

OASIS, "eXtensible Access Control Markup Language (XACML)—Version 2.0," Feb. 1, 2005, 141 pages.

Object Management Group (OMG), "Business Process Model and Notation (BPMN)—Version 2.0," Jan. 2011, 538 pages.

Alfonoso Rodriguez et al., "A BPMN Extension for the Modeling of Security Requirements in Business Processes," IEICE Transactions on Information and Systems, vol. E90-D, No. 4, Apr. 2007, pp. 745-752.

Karsten Sohr et al., "Specification and Validation of Authorization Constraints Using UML and OCL," Proceedings of the 10th European Symposium Research in Computer Security, ESORICS 2005, Sep. 2005, Lecture Notes in Computer Science 3679, pp. 64-79.

Christian Wolter et al., "An Approach to Capture Authorisation Requirements in Business Processes," Requirements Engineering, Nov. 2010, vol. 15, Issue 4, pp. 359-373.

Christian Wolter et al., "Model-driven business process security requirement specification," Journal of Systems Architecture: the EUROMICRO Journal, vol. 55, Issue 4, Apr. 2009, pp. 211-223.

Christian Wolter et al., "Modeling of Task-Based Authorization Constraints in BPMN," Proceedings of the 5th International Conference on Business Process Management, BPM 2007, Lecture Notes in Computer Science 4714, Sep. 2007, pp. 64-79.

Christian Wolter et al., "Deriving XACML Policies from Business Process Models," Proceedings of the 8th International Conference on Web Information Systems Engineering, WISE'07, Dec. 2007, Lecture Notes in Computer Science 4832, pp. 142-153.

Christopher Fox et al., "IT Control Objectives for Sarbanes-Oxley: The Role of IT in the Design and Implementation of Internal Control Over Financial Reporting," 2nd Edition, Sep. 2006, IT Governance Institute, Rolling Meadows, IL, USA, 128 pages.

Anindya Ghose, "Information Disclosure and Regulatory Compliance: Economic Issues and Research Directions,"New York University—Leonard Stern School of Business, Jul. 2006, retrieved from http://ssrn.com/abstract=921770, 18 pages.

Vassilis Kapsalis et al., "A dynamic context-aware access control architecture for e-services," Computers & Security, vol. 25, Issue 7, Oct. 2006, pp. 507-521.

Paul E. Proctor et al., "MarketScope for Segregation of Duty Controls within ERP and Financial Applications," ID No. 000161625, Gartner Research, Sep. 25, 2008, 12 pages.

Jim Sinur et al., "Magic Quadrant for Business Process Management Suites," Gartner RAS Core Research Note G00205212, Gartner Research, Oct. 2010, 24 pages.

Lineke Sneller et al., "Sarbanes Oxley Section 404 Costs of Compliance: a case study," Corporate Governance: An International Review, vol. 15, No. 2, Mar. 2007, pp. 101-111.

David Basin et al., "Separation of Duties as a Service," Proceedings of the 6th ACM Symposium on Information, Computer and Communications Security, ASIACCS'11, Mar. 2011, pp. 423-429.

Kleppe, A., Warmer, J., Bast, W.: MDA Explained. The Model Driven Architecture: Practice and Promise. Addison-Wesley (2003), 183 pages.

* cited by examiner

US 9,286,187 B2

STATIC ENFORCEMENT OF PROCESS-LEVEL SECURITY AND COMPLIANCE SPECIFICATIONS FOR CLOUD-BASED SYSTEMS

BACKGROUND

Business-process driven systems form the backbone of most modern enterprises. Consequently, process models are becoming more and more important (e.g., as a documentation artifact, for controlling and steering the execution of business processes). Further, the number of businesses that operate in regulated markets (i.e., markets in which compliance regulations are applicable) is increasing. Such compliance regulations, along with the increased awareness of information technology (IT) security, result in a need for modeling, analyzing and execution techniques for business processes that treat security, privacy and compliance properties in business processes as first class citizens. In general, this leads to the need for complex and dynamic security policies as well as a significant increase in the costs for manual system audits.

SUMMARY

Implementations of the present disclosure include methods for statically checking conformance of a computer-implemented service at a source code level to requirements specified at a process level. In some implementations, methods include actions of receiving source code of the computer-implemented service, receiving one or more rules, the one or more rules being generated based on a mapping and including a set of technical requirements that can be checked on the source code level, the mapping associating the requirements with the source code, and processing the source code and the one or more rules using static code analysis (SCA) to generate a result, the result indicating whether the computer-implemented service conforms to the requirements.

In some implementations, the requirements include compliance and/or security requirements.

In some implementations, the requirements include one or more of a separation of duty requirement, a binding of duty requirement, a need to know requirement, a confidentiality requirement, an access control requirement, an absence of implementation level vulnerabilities requirement, a prohibition on use of insecure random generators requirement, a prohibition on dynamic code execution that can be influenced by user input requirement, a data integrity requirement, an authenticity of communication channel between different service providers requirement, an encrypted data storage requirement, and an inhibiting derived data requirement.

In some implementations, actions further include receiving a process model from a model repository, extracting one or more interfaces based on the process model, and generating the mapping based on the one or more interfaces.

In some implementations, the process model is provided as a computer-readable process model that is defined using a process modeling language.

In some implementations, the computer-implemented service provides one or more of interfaces and functionality that can be implemented with the process.

In some implementations, the result indicates that the computer-implemented service does not conform to the requirements.

In some implementations, actions further include generating non-conformance information indicating one or more portions of the source code that do not conform to the requirements, and providing the non-conformance information for display to a user.

In some implementations, the computer-implemented service includes a web service.

In some implementations, actions further include providing the result for display to a user.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is to say that methods in accordance with the present disclosure are not limited to the combinations of aspects and features specifically described herein, but also include any combination of the aspects and features provided.

The details of one or more embodiments of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
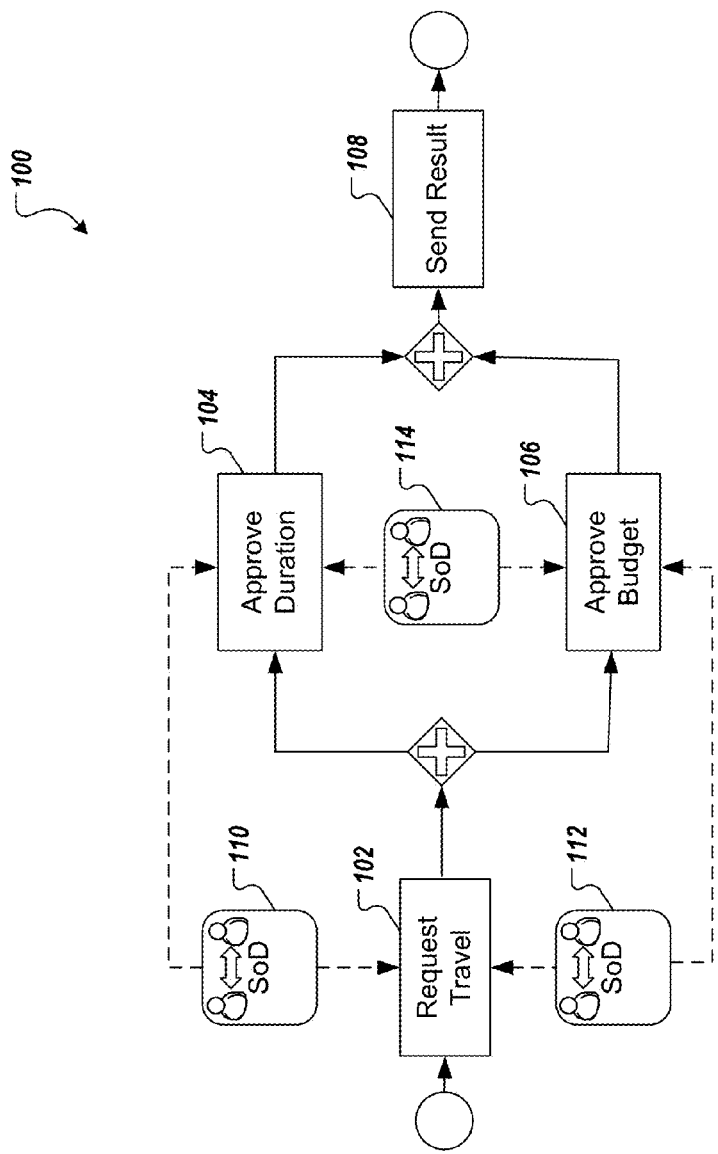
FIG. 1 depicts an example business process.

Implementations of the present disclosure are generally directed to statically checking conformance or security of service implementations (e.g., web services) at the source code level to requirements specified at the process level. More particularly, implementations of the present disclosure are directed to using high-level process specification as input to static code analysis (SCA). In some implementations, requirements that are to be fulfilled at the source code level (e.g., by computer programs implementing user interfaces for human executed tasks and/or by computer programs that execute tasks) are automatically derived from the high-level specification (e.g., business process model (BPM)). SCA is performed on the source code based on one or more rules. The one or more rules define a set of technical requirements to be checked at the source code level. A result is provided and indicates whether the source code underlying the service conforms to the requirements specified at the process level.

As noted above, process driven systems are an integral part of most modern enterprises. Consequently, process models, such as business process models (BPMs) and process modeling are increasing in importance, not only as a documentation artifact but also for controlling and steering the execution of business processes. Further, an increasing number of enterprises operate in regulated markets, in which the businesses are required to comply with regulations (e.g., the Health Insurance Portability and Accountability Act (HIPAA) in the health care sector, Basel II in the financial sector). Such compliance regulations along with the increased awareness of IT security result in the need for modeling, analyzing, and execution techniques for business processes that treat security, privacy, and compliance properties as first class citizens.

Modern service-oriented or cloud-based infrastructures are usually operated by multiple parties and include several technical layers. Example technical layers can include a user interface layer, a process layer and an object layer. In some examples, the user interface layer manages interactions with end users (e.g., enabling end users to claim new tasks, querying input or displaying results). In some examples, the process layer (e.g., business process layer) can include a process execution engine that connects the user interface layer and the object layer (e.g., for human-executed tasks, the necessary interaction with users is triggered; for computer-executed tasks, the calls to backend systems or services). In some examples, the object layer (or service layer) includes backend systems and (external) services providing the functionality required for implementing the service tasks. Each technical layer needs to comply with the applicable compliance and security requirements.

As discussed in further detail herein, implementations of the present disclosure ensure that the process-service integrations and system configurations in the user interface layer and the process layer comply with the process level security and compliance requirements. In accordance with the present disclosure, the compliance of a service implementation to requirements is statically guaranteed at design-time. In this manner, the runtime performance is improved as a result of a reduced number of run-time checks. Further, costs associated with system audits are reduced, because there is no need for analyzing generated log files for validating the compliance to the properties that are already statically guaranteed.

Modeling security properties, as a first class citizen of business processes, requires an integrated language for both security, compliance and business requirements. One option to achieve this is the extension of a process modeling language with security concepts. In some implementations, the meta-modeling approach for extending the meta-model of business process model and notation (BPMN) with a security language is followed. This approach is, for example, followed by SecureBPMN, which enables the specification of role-based access control (RBAC) and other security and compliance properties. In some examples, SecureBPMN enables the specification of security properties at a fine granular level. For example, separation of duty (Sod) and binding of duty (BoD) can restrict individual permissions (e.g., completing a task requires two clerks or one manager) rather than restricting the whole task. Although SecureBPMN is discussed herein, it is appreciated that implementations of the present disclosure can be realized using other secure business process modeling methodologies. Also the combination of a dedicated business process or workflow modeling language (e.g., BPMN, BPEL) together with separate specifications of the required security and/or compliance requirements can be implemented.

FIG. 1 depicts an example business process model (BPM) 100 that models a business process that includes a plurality of tasks (actions). The example BPM 100 can be generated using secure process modeling (e.g., SecureBPMN). The example BPM 100 is provided as a travel approval process in which a budget and a travel duration need to be approved by different managers before travel is approved. In the depicted example, the BPM 100 includes a request travel task 102, an approve duration task 104, and approve budget task 106 and a send result task 108.

The example BPM 100 can include compliance and/or security requirements. Example compliance and security requirements can include access control, SoD, BoD and need to know. With regard to access control, access to resources and/or authorization to perform tasks are to be restricted to certain user roles (e.g., clerks, managers) of users. In the depicted example, a simple role hierarchy containing the roles staff and manager can be provided, where every member of the role manager is also a member of the role staff. Further, the role staff has full access (e.g., is allowed to claim, execute, or cancel) for the request travel task 102, and members of the role manager have full access for the approve duration task 104 and the approve budget task 106.

Other example compliance and security requirements can include the absence of implementation level vulnerabilities (e.g., SQL injection, buffer overflows, cross-site scripting (XSS), the use of insecure random generators, dynamic code execution that can be influenced by user input, data integrity, authenticity of communication channels between different service providers, requiring stored data to be encrypted. In some examples, requirements can include checking for derived data. For example, if data X is to be kept confidential, one can also specify whether confidentiality also holds for data that is derived by processing data X. Implementations of the present disclosure enable such a check, because data flow and control flow are taken into account on the process level as well as on the implementation level.

With regard to SoD, tasks can be required to be performed by different users. Consequently, SoD provides that more than one user is required to successfully complete the process. In the depicted example, SoD can be used to ensure that the user requesting travel is not allowed to approve the duration or the budget (even though the user might be a member of the role manager). More specifically, a SoD 110 is provided between the request travel task 102 and the approve duration task 104, a SoD 112 is provided between the request travel task 102 and the approve budget task 106, and a SoD 114 is provided between the approve duration task 104 and the approve budget task 106. Consequently, and in accordance with the example BPM 100, the user that performs the request travel task 102 must be different from the user that performs the approve duration task 104 and the approve budget task 106. Further, the user that performs the approve duration task 104 must be different from the user that performs the approve budget task 106.

BoD can be provided to ensure that certain tasks are handled by the same user. Need to know can be implemented to ensure that users are only able to access the information that is required for their work. In the depicted example, need to know can be implemented to ensure, for example, that the manager approving the absence has only access to the duration of the travel and the manager approving the budget has only access to the travel costs.

In general, the BPM 100 provides a high-level specification of a business process. In some implementations, requirements that are to be fulfilled at the source code level by computer programs implementing user interfaces for human-executed tasks are automatically derived. With continued reference to the example of FIG. 1, the request travel task 102, the approve duration task 104 and the approve budget task 106 can be human-executable tasks that are achieved using user interfaces. In some implementations, requirements that are to be fulfilled at the source code level by computer programs that execute tasks (i.e., computer-executed tasks) are automatically derived. It is appreciated that a computer program can provide user interfaces for human-executable tasks and can itself perform computer-executable tasks.

In the context of an enterprise system, execution of the process modeled by the BPM 100 requires more than deploying the BPM 100 in a business process execution engine. Among others, user interfaces for the human-executed tasks (e.g., the request travel task 102, the approve duration task 104, the approve budget task 106) need to be implemented. In some examples, an implementation of the user interface for the request travel task 102 can be provided using an HTML-like formalism called form properties. In some examples, the internal flow of computer-executed tasks (e.g., the send result task 108) also needs to be implemented. In some examples, computer-executed tasks can be implemented as a service (e.g., in Java as a web service). These examples illustrate that the implementation of process-driven systems requires more than the BPM 100 itself. Moreover, these artifacts are quite low-level as compared to the high-level process models. Consequently, specifying security and compliance properties at the process level is not enough to ensure the secure and compliant operation of process-driven enterprise systems.

Although a service (e.g., a web service) is provided as an example, it is appreciated that the present disclosure is applicable to services as well as configuration for runtime deployment for example (e.g., so called deployment constructors or security configurations for the runtime environment/container). In some implementations, checks can be included for the security configuration of backend systems such as databases or legacy systems (e.g., checking the access control configurations used for accessing legacy business systems).

Implementations of the present disclosure enable the conformance of source code artifacts to process level requirement specifications to be checked. Such conformance checks can be done statically at design-time to improve the overall run-time of process-driven systems, because they reduce the number of run-time security checks required. In accordance with implementations of the present disclosure, a high-level process specification can be provided as input to SCA to automatically derive requirements that are to be fulfilled at the source code level. That is, requirements that are to be fulfilled by the source code that provides the functionality of the service are derived from the high-level process specification of the service. In some examples, SCA is a technique that statically analyses the computer program of a service (e.g., the source code or the byte code) without actually executing the computer program. In some examples, SCA can implement formal techniques such as abstract interpretation.

For example, and with continued reference to the example of FIG. 1, implementations of the present disclosure can ensure, at design-time (i.e., without additional costs incurred at run-time or during a subsequent audit of the business process), that a user interface that is provided for the approve duration task 104 does not show of enable access to budget information, and that the user interface provided for the approve budget task 106 does not show or enable access to travel details (e.g., duration, destination, etc.). Further, implementations of the present disclosure ensure that any necessary runtime-checks for enforcing the access control for all tasks are actually implemented, and that neither a service nor a user interface accesses information in one or more backend systems that is not needed for executing the particular process. That is, the user interfaces and/or the computer-executed tasks are only able to access information that is needed for performance of respective tasks.

In some implementations, the high-level requirements can be extracted from an annotated BPM. In some implementations, the high-level requirements can be extracted from a specification document that is provided with a BPM. In some examples, requirements that can be checked using SCA are identified and are translated to the source code level. More particularly, and in some implementations, checking process-level security and compliance specifications on the source code level is achieved by linking the source code artifacts to process-level concepts such as tasks, data objects or process variables, as well as translating the high-level security and compliance requirements to low-level concepts on the source code level. In some examples, translation is achieved using a mapping of process-level security concepts to implementation aspects. Table 1 provides an example mapping:

TABLE 1

Mapping Process-Level Requirements to Source Code (Implementation) Level

| | Service Impl. | UI (Form Prop.) | UI (Java) |
|---|---|---|---|
| Access Control | AC check impl. | — | AC check impl. |
| SoD | AC check impl. | — | AC check impl. |
| BoD | AC check impl. | — | AC check impl. |
| Need to Know | proc. var. access | proc. var. access | proc. var. access |
| Confidentiality | dataflow | proc. var. access | dataflow |

Table 1 summarizes an example mapping from process-level security concepts to checks at the source code (or implementation) level for a plurality of different implementation aspects. The translated (mapped) requirements are provided as input to SCA, which analyzes the translated requirements and generates a result. In some examples, the result includes an indication as to whether the service implementation complies with the requirements. In some examples, and as discussed in further detail below, the result can be displayed to a user (e.g., to a service (business process) developer on an interface provided in a service development environment).

In further detail, and with reference to the example mapping of Table 1, implementation aspects include service tasks (Service Implementation) and two forms of implementing user interfaces (e.g., form properties provided by a process execution engine and user interfaces implemented in Java). In some examples, for service task implementations (e.g., in Java), the use of access control checks for enforcing access control in general, SoD and BoD in particular, are statically ensured. If it is assumed that, for example, actual enforcement is based on a standard architecture for distributed systems (e.g., using an XACML policy decision point), it can only be ensured that the policy enforcement point is implemented correctly, while still relying on a correctly implemented or generated policy. That is, it can be ensured that the policy is correctly implemented, but it cannot be ensure that the policy itself is a correct policy.

To ensure the conformance to need to know, the read/write access to process variables representing data objects can be checked. Similarly, it can be checked whether a task implementation can access confidential information. In some examples, checking confidentiality requirements can be achieved using dataflow analysis at the source code level. In this manner, compliance can be ensured in situations where confidential information can be processed locally, but is not persisted or transmitted to a third party. In some examples, fine-grained requirements (e.g., encrypting a data object using a specific encryption algorithm and key length) can be checked at the source code level.

In some implementations, for user interface implementations using form properties, a limited set of properties can be checked. In some examples, whether a form accesses certain process variables indicating violations against need to know or data confidentiality can be checked. For other requirements, access control in particular, reliance is placed on checks by the business layer components or on the business object layer enforcement. In some implementations, for user interfaces written in Java, for example, the same checks applied for service task implementation can be used. In some examples, from a security perspective, security checks in the user interface layer are not relied upon. Consequently, security checks in the user interface layer are in addition to checks in the other layers.

In a broader scope, implementations of the present disclosure can ensure that systems that should not be communicating with one another during execution of the service are indeed not able to communicate with each other, that only secure communication channels (e.g., encrypted and authenticated), and that data is not sent to third parties. Further, implementations of the present disclosure can ensure that access control is enforced across all implementations layers, user interfaces of tasks only access data (e.g., modeled as data objects or process variables) needed to execute the service, automated tasks (i.e., computer-executed tasks) only access data (e.g., modeled as data objects or process variables) needed to execute the service. Further, implementations of the present disclosure ensure that any necessary checks at run-time (e.g., for ensuring (dynamic) SoD and BoD requirements) are implemented, that data integrity checks are implemented and that data is encrypted before storage in databases and/or other storage locations.

Figure 2:
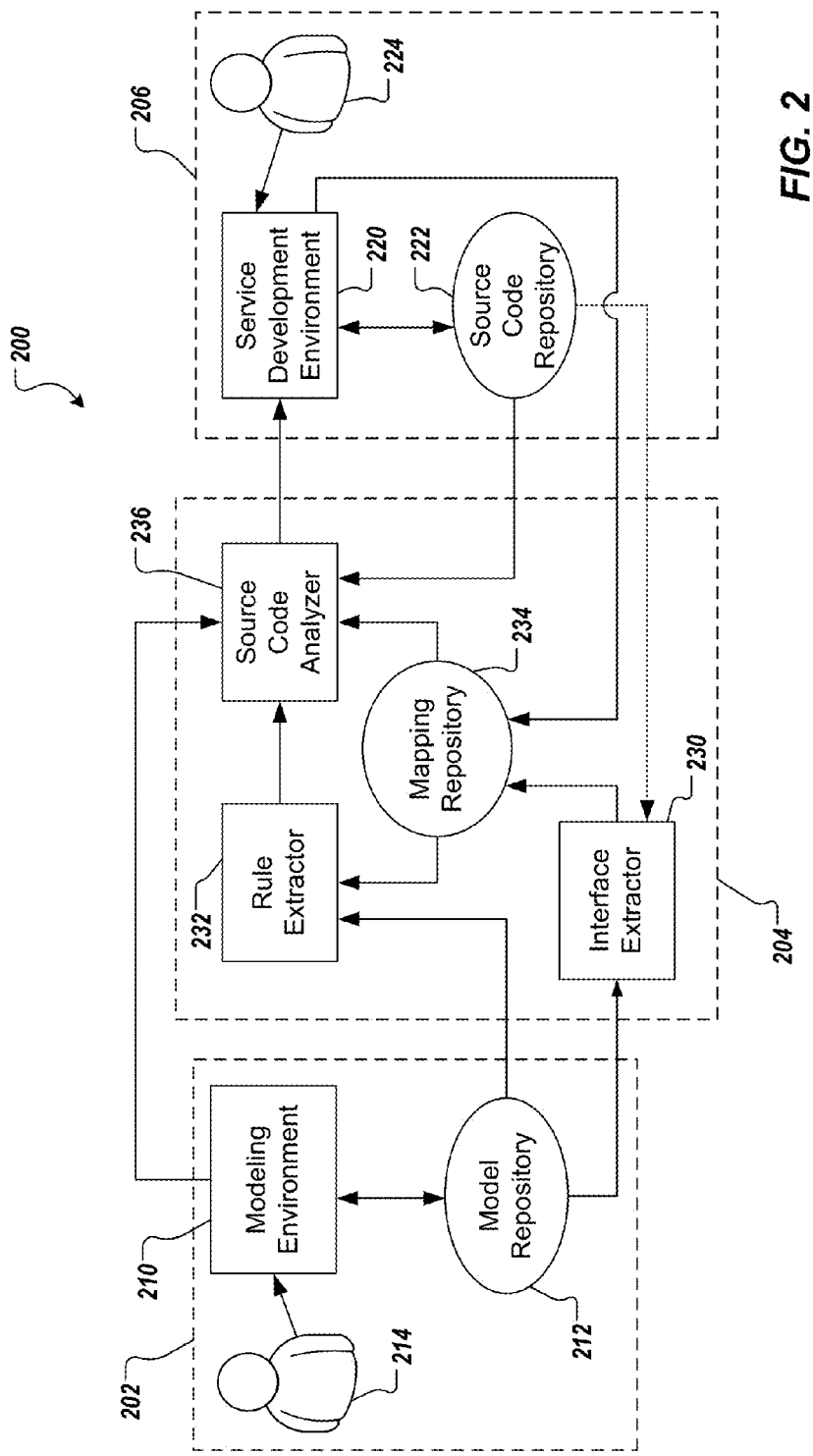
FIG. 2 depicts an example system architecture for executing implementations of the present disclosure.

FIG. 2 depicts an example system architecture 200 for executing implementations of the present disclosure. The system architecture 200 includes a modeling system 202, a compliance system 204 and a service development system 206. As discussed herein, the compliance system receives data associated with a service from each of the modeling system and the service development system 206 and processes the data to determine whether the service complies with one or more requirements provided for the service.

In the depicted example, the modeling system 202 includes a modeling environment 210 and a model repository 212. In some examples, the process modeling environment 210 is provided as one or more computer-executable programs that can be executed using one or more computing devices. In some examples, the modeling environment 210 is provided as business process modeling software that can be used to generate BPMs. For example, a process expert 214 can provide input to the modeling environment to define one or more BPMs. In some examples, models can be stored as computer-readable documents in the model repository 212. For example, the BPM 100 of FIG. 1 can be generated using the modeling environment 210 and can be stored in the model repository 212. In some examples, a model can be annotated to include requirements that the service is to comply with. In some examples, a specification document can be generated and can be associated with a particular model, the specification document defining requirements that the service is to comply with.

In the depicted example, the service development system 206 includes a service development environment 220 and a source code repository 222. In some examples, the service development environment 220 is provided as one or more computer-executable programs that can be executed using one or more computing devices. In some examples, a service developer 224 can use the service development system 206 to provide a service (e.g., a web service) and can store the source code embodying the service in the source code repository 222. In some examples, the service can include a service that supports a process (e.g., business process) provided modeling system 202. For example, the service can provide interfaces (e.g., user interfaces, service interfaces) and functionality (e.g., computer-executed tasks) that can be used to execute the process. As discussed in further detail herein, the compliance system 204 can ensure that the service complies with requirements provided for the process.

In the depicted example, the compliance system 204 includes an interface extractor 230, a rule extractor 232, a mapping repository 234 and a source code analyzer 236. In some examples, each of the interface extractor 230, the rule extractor 232 and the source code analyzer 236 is provided as one or more computer-executable programs that can be executed using one or more computing devices.

In some implementations, the interface extractor 230 receives a process model from the model repository 212 and processes the process model to extract one or more interfaces for human-executable tasks (i.e., user interfaces) and/or one or more interfaces for computer-executable tasks. In some examples, the extracted interfaces are used for managing a mapping between the model level (process layer) and the source code level (implementation layer). The mapping is stored in the mapping repository 234.

In some implementations, the interface extractor 230 can extract service names from the task descriptions (e.g., provided from the model repository 212). In some examples, service names can be automatically extracted based on naming conventions, the interfaces can be extracted automatically. In some examples, the process expert 214 can manually configure the service names and can store the service names together with the process models/task descriptions in the model repository 212. In some implementations, the services names are extracted (manually or automatically) from the service implementation by the service developer 224.

In some implementations, the rule extractor 232 extracts process level security and compliance specifications (requirements) for the process model from the model repository 212. In some examples, the process level security and compliance specifications are extracted from annotations provided for the process model. In some examples, the process level security and compliance specifications are extracted from a specification document that is associated with the process model. In some implementations, the rule extractor 232 translates the process level security and compliance specifications to the implementation level. In some examples, translation of the process level security and compliance specifications includes a decomposition of high-level requirements into a set of technical requirements that can be checked on the source code level.

In some implementations, the source code analyzer 236 checks the source code layer and the interfaces of the process layer based on the extracted rules provided from the rule extractor 232. In some examples, the source code analyzer 236 uses SCA, as discussed herein. The results of the analysis are provided to the service development environment 220 for display to the service developer 224. In some implementations, the results can be provided to the modeling environment 210 for display to the process expert 214.

Implementations of the present disclosure will be discussed in further detail with reference to an example use case. The example use case includes secure and/or compliant development of a service-oriented process-driven system. It is appreciated, however, that implementations of the present disclosure are applicable to other use cases.

The example use case can be split into sub-scenarios. A first sub-scenario includes secure (business) process modeling and a second sub-scenario includes the development of the services implementing at least parts of the process.

In some examples, during the secure process modeling, a process expert (e.g., the process expert 214 of FIG. 2) models the process using an enhanced process modeling environment (e.g., the modeling environment 210 of FIG. 2). In some examples, the enhanced process modeling environment enables the process expert (possibly in conjunction with domain and/or compliance experts) to specify process-level security and compliance requirements.

In some examples, modeled processes are implemented (e.g., completely or partially) by services. To ensure that the developed services are correct (i.e., provide the specified functionality), compliant (i.e., comply to the specified compliance requirements) and secure (i.e., are free of vulnerabilities and implement core security requirements such as access control), a compliance system (e.g., the compliance system 204 of FIG. 2) links the process models with the development environment of the developer. In this manner, the service developer (e.g., the service developer 224 of FIG. 2) receives the requirements translated to the implementation level as well as tools for automatically checking fulfillment of the requirements.

Figure 3:
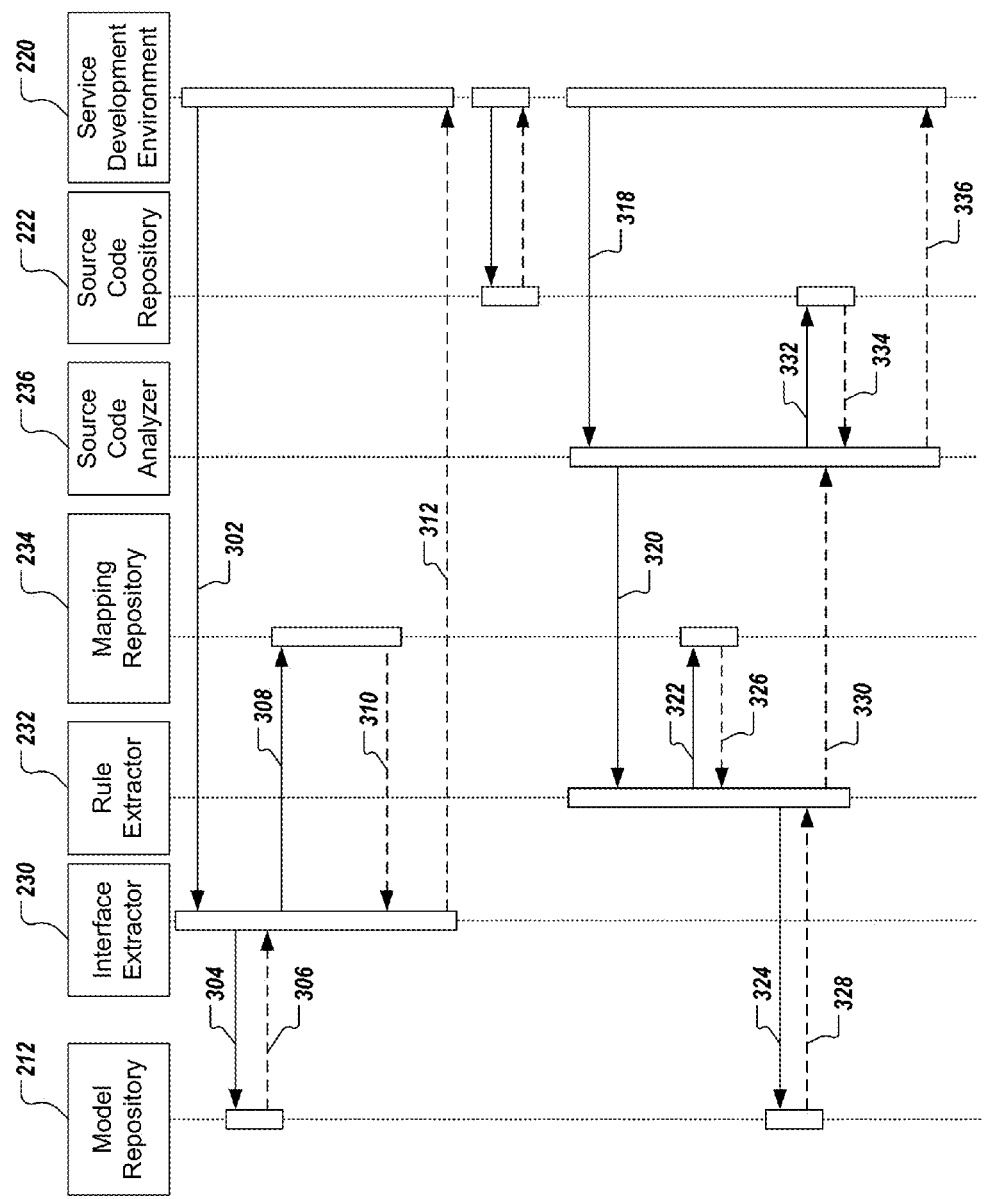
FIG. 3 depicts an example sequence diagram in accordance with implementations of the present disclosure.

Referring now to FIG. 3, the example use case will be described in further detail. FIG. 3 depicts an example sequence diagram 300 in accordance with implementations of the present disclosure. The sequence diagram 300 depicts examples communications between components of the system architecture 200 of FIG. 2 in accordance with implementations of the present disclosure.

In the depicted example, a service developer (e.g., the service developer 224 of FIG. 2) interacts with the service development environment 224 identify a process that is to be implemented by a service. The service developer initiates the creation of the service interfaces for implementing the process based on the process model underlying the process. To that end, the service developer, using the service development environment 234, initiates the interface generation using the interface extractor 230. In some examples, and in response to input, the service development environment 224 issues a request 302 to the interface extractor 230. In some examples, the request 302 is a request for an interface description and indicates a process and/or process model that are to be implemented by a service being developed. In some examples, the request 302 includes the service name or the task name, which enables relevant information to be retrieved.

In response to the request 302, the interface extractor 304 sends a request 304 to (i.e., queries) the model repository 212. In some examples, the request 304 identifies the process and/or the process model. The model repository 212 provides a response 306 that includes requisite process information (e.g., the process model). The interface extractor 230 generates a mapping between tasks of the process and interfaces of the service. The interface extractor 230 sends a request 308 to the mapping repository 234 to store the mapping. The mapping repository 234 sends a response to the interface extractor 230 confirming storage of the mapping. The interface extractor 230 sends a response 312 to the service development environment 224. In some examples, the response 312 includes the requested interface description (e.g., interfaces and stubs).

Using the infrastructure provided by service development environment 220, the service developer generates and stores interface stubs the source code repository 222. In some examples, the service developer creates or modifies the source of the services and stores the result in the source code repository 222. In some examples, the service developer may need to change the source code of the service implementation manually (e.g., editing the source code or configuration files using the service development environment) to correct violations found during the analysis. In some examples, and for some violations, the analysis is able to automatically fix the source code/configuration files. In some examples, automated fixes can be applied with or without interaction with the service developer. In general, modifications can be provided to transform an insecure or non-compliant service implementation/configuration into a secure and compliant implementation/configuration.

The correctness, security and compliance of the service at the source code level can be checked. In some examples, the service developer, using the service development environment 220, sends a request to the source code analyzer 326 to check that the service implementation fulfills specified requirements. In response to the request 318, the source code analyzer 236 sends a request 320 to the rule extractor 232 to generate a process-specific mapping. In response to the request 320, the rule extractor sends a request 322 to the mapping repository 234 and a request 324 to the model repository 212. In response to the request 322, the mapping repository provides the mapping that was generated for the specified process and the specified service (e.g., specified in the request 322). The mapping is provided in a response 326. In response to the request 324, process model information (e.g., security and compliance requirements) for the specified process (e.g., specified in the request 324) is provided in a response 328.

The rule extractor 232 process the information received from the model repository 212 and the mapping repository 234 and generates a setup for the analysis of the service implementation. In some examples, the setup includes one or more rules that are to be applied for SCA. The rule extractor 232 provides the setup to the source code analyzer 236. The source code analyzer 236 sends a request 332 to the source code repository 232 requesting source code for the service implementation. The source code repository 222 provides a response 334 to the source code analyzer 236, the response 334 including the source code. The source code analyzer 236 performs SCA based on the source code and the one or more rules and generates a result (e.g., compliant, non-compliant, service fulfills the requirements, required property violated in module x on line y). The source code analyzer 236 provides a response 336 to the service development environment 220, the response 336 including the result. The service development environment 220 displays the result to the service developer. In some examples, non-conformance information can be generated and can indicate one or more portions of the source code that do not conform to the requirements (e.g., required property violated in module x on line y).

Figure 4:
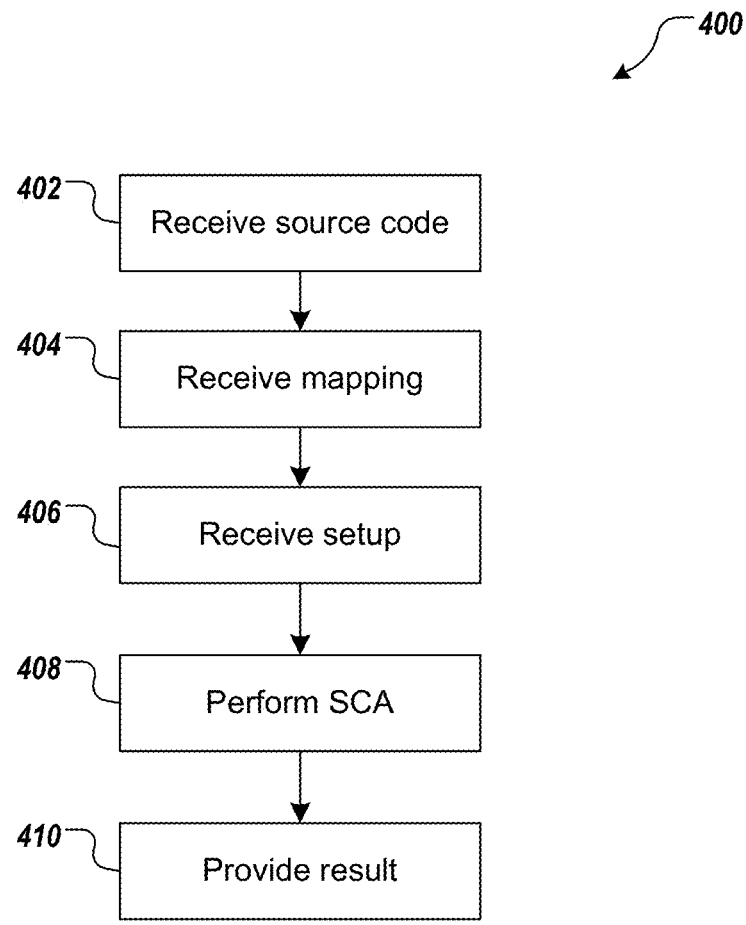
FIG. 4 is a flowchart illustrating an example process that can be executed in implementations of the present disclosure.

FIG. 4 is a flowchart illustrating an example process 400 that can be executed in implementations of the present disclosure. In some implementations, the example process 400 can be realized using one or more computer-executable programs that are executed using one or more computing devices.

Source code is received (402). More particularly, the source code includes source code of a computer-implemented service that is to be checked for conformance to requirements specified for a process to be used with the service. For example, and with reference to FIG. 2, the source code analyzer 236 can receive the source code from the source code repository 222. A mapping is received (404). More particularly, the mapping associates the requirements with the source code. For example, and with reference to FIG. 2, the rule extractor 232 can receive the mapping from the mapping repository 234. A setup is received (406). More particularly, the setup includes one or more rules that provide a set of technical requirements that can be checked on the source code level. For example, and with reference to FIG. 2, the source code analyzer 236 receives the setup from the rule extractor 232. The source code and the setup (the one or more rules) are processed using SCA to generate a result (408). More particularly, the result indicates whether the service conforms to the requirements. For example, and with reference to FIG. 2, the source code analyzer 236 performs SCA to generate the result. The result is provided (410). For example, and with reference to FIG. 2, the result can be provided for display to the service developer 224 and/or the process expert 214.

Figure 5:
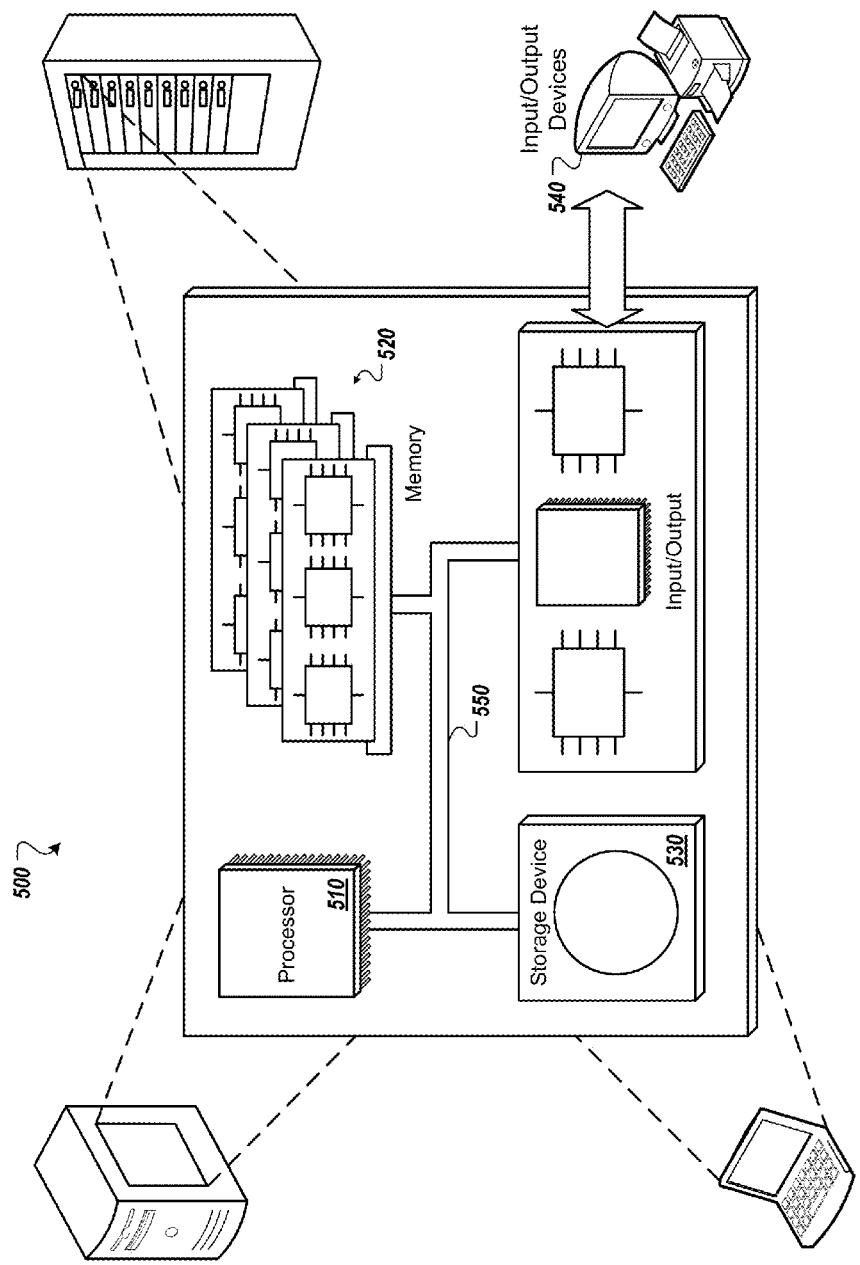
FIG. 5 is a schematic illustration of example computer systems that can be used to execute implementations of the present disclosure.

FIG. 5 is a schematic illustration of example computer systems 500 that can be used to execute implementations of the present disclosure. The system 500 can be used for the operations described in association with the implementations described herein. For example, the system 500 may be included in any or all of the server components discussed herein. The system 500 includes a processor 510, a memory 520, a storage device 530, and an input/output device 540. Each of the components 510, 520, 530, 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for statically checking conformance of a computer-implemented service at a source code level to requirements specified at a process level, the method being executed using one or more processors and comprising:
    receiving, by the one or more processors, source code of the computer-implemented service, the source code comprising a service name identifying a process that is associated to the computer-implemented service;
    generating, by the one or more processors, a request indicating a process model generated using secure business process modeling and the request comprising the service name;
    receiving in response to the request, by the one or more processors and from a model repository, the process model;
    extracting, by the one or more processors and from the model repository, requirements of the process model that the computer-implemented service is to comply with, the requirements comprising an access control defining an authorization based on each of a plurality of user roles to perform tasks, a separation of duty restricting a first task based on one of the plurality of user roles, and a binding of duty requiring the completion of a second task based on one or more of the plurality of user roles;
    extracting, by the one or more processors, one or more interfaces based on the process model;
    generating, by the one or more processors, a mapping of process level security and compliance specifications to implementation level security and compliance specifications, the mapping associating the requirements with the source code based on the one or more interfaces;
    providing, by the one or more processors, one or more rules comprising a set of technical requirements that can be checked on the source code level, the one or more rules being provided based on the requirements and the mapping; and
    processing, by the one or more processors, the source code and the one or more rules using static code analysis (SCA) to generate a result, the result indicating whether the computer-implemented service conforms to the requirements.

2. The method of claim 1, wherein the requirements comprise compliance and/or security requirements.

3. The method of claim 1, wherein the requirements further comprise one or more of a need to know requirement, a confidentiality requirement, an access control requirement, an absence of implementation level vulnerabilities requirement, a prohibition on use of insecure random generators requirement, a prohibition on dynamic code execution that can be influenced by user input requirement, a data integrity requirement, an authenticity of communication channel between different service providers requirement, an encrypted data storage requirement, and an inhibiting derived data requirement.

4. The method of claim 1, wherein the process model is provided as a computer-readable process model that is defined using a process modeling language.

5. The method of claim 1, wherein the computer-implemented service provides one or more of interfaces and functionality that can be implemented with the process.

6. The method of claim 1, wherein the result indicates that the computer-implemented service does not conform to the requirements.

7. The method of claim 1, further comprising:
    generating non-conformance information indicating one or more portions of the source code that do not conform to the requirements; and
    providing the non-conformance information for display to a user.

8. The method of claim 1, wherein the computer-implemented service comprises a web service.

9. The method of claim 1, further comprising providing the result for display to a user.

10. A non-transitory computer-readable medium coupled to the one or more computers having instructions stored thereon which, when executed by the one or more computers, cause the one or more computers to perform operations for statically checking conformance of a computer-implemented service at a source code level to requirements specified at a process level, the operations comprising:
    receiving source code of the computer-implemented service comprising a service name identifying a process that is associated to the computer-implemented service;
    generating a request indicating a process model generated using secure business process modeling and the request comprising the service name;
    receiving in response to the request, from a model repository, the process model;
    extracting, from the model repository, requirements of the process model that the computer-implemented service is to comply with, the requirements comprising an access control defining an authorization based on each of a plurality of user roles to perform tasks, a separation of duty restricting a first task based on one of the plurality of user roles, and a binding of duty requiring the completion of a second task based on one or more of the plurality of user roles;
    extracting one or more interfaces based on the process model;
    generating a mapping of process level security and compliance specifications to implementation level security and compliance specifications, the mapping associating the requirements with the source code based on the one or more interfaces;
    providing one or more rules comprising a set of technical requirements that can be checked on the source code level, the one or more rules being provided based on the requirements and the mapping; and
    processing the source code and the one or more rules using static code analysis (SCA) to generate a result, the result indicating whether the computer-implemented service conforms to the requirements.

11. A system for sharing data in a supply chain, the data corresponding to an item having a tag associated therewith, the system comprising:
    one or more computers; and
    a computer-readable medium coupled to the one or more computers having instructions stored thereon which, when executed by the one or more computers, cause the one or more computers to perform operations for statically checking conformance of a computer-implemented service at a source code level to requirements specified at a process level, the operations comprising:
        receiving source code of the computer-implemented service, the source code comprising a service name identifying a process that is associated to the computer-implemented service;

generating a request indicating a process model generated using secure business process modeling and the request comprising the service name;
receiving in response to the request from a model repository, the process model;
extracting, from the model repository, requirements of the process model that the computer-implemented service is to comply with, the requirements comprising an access control defining an authorization based on each of a plurality of user roles to perform tasks, a separation of duty restricting a first task based on one of the plurality of user roles, and a binding of duty requiring the completion of a second task based on one or more of the plurality of user roles;
extracting one or more interfaces based on the process model;
generating a mapping of process level security and compliance specifications to implementation level security and compliance specifications, the mapping associating the requirements with the source code based on the one or more interfaces;
providing one or more rules comprising a set of technical requirements that can be checked on the source code level, the one or more rules being provided based on the requirements and the mapping; and
processing the source code and the one or more rules using static code analysis (SCA) to generate a result, the result indicating whether the computer-implemented service conforms to the requirements.

* * * * *